(12) United States Patent
Gerszberg et al.

(10) Patent No.: US 6,226,362 B1
(45) Date of Patent: May 1, 2001

(54) VIDEO PHONE INTERACTIVE CORPORATE MENU ANSWERING MACHINE ANNOUNCEMENT

(75) Inventors: Irwin Gerszberg, Kendall Park; Jeffrey S. Martin, Dover; Hopeton S. Walker, Haledon, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/001,575

(22) Filed: Dec. 31, 1997

(51) Int. Cl.[7] .................................................. H04M 1/64
(52) U.S. Cl. ................................. 379/88.13; 379/88.19; 348/14.06
(58) Field of Search .................................. 348/14.01, 15, 348/16, 14.06; 379/67.1, 88.13, 88.19, 88.2, 88.21

(56) References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,725,694 | 2/1988 | Auer et al. . |
| 4,916,441 | 4/1990 | Gombrich . |
| 5,014,267 | 5/1991 | Tompkins et al. . |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,414,457 | * 5/1995 | Kadowaki et al. ..................... 348/14 |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,619,684 | 4/1997 | Goodwin et al. . |
| 5,644,628 | 7/1997 | Schwarzer et al. . |
| 5,671,267 | 9/1997 | August et al. . |
| 5,682,195 | 10/1997 | Hendricks et al. . |
| 5,684,918 | 11/1997 | Abecassis . |
| 5,778,053 | * 7/1998 | Skarbo et al. ..................... 348/14 X |
| 5,822,404 | * 10/1998 | Cave ..................... 379/67 |
| 5,896,165 | * 4/1999 | Rao ..................... 348/14 |
| 5,900,906 | * 5/1999 | Murakumo et al. ..................... 348/14 |
| 6,038,296 | * 10/1999 | Brunson et al. ................ 379/100.11 |

* cited by examiner

*Primary Examiner*—Scott L. Weaver
(74) *Attorney, Agent, or Firm*—Banner & Witcoff, Ltd.

(57) ABSTRACT

A video enable answering machine having many new features including customized video announcement messages, caller ID based video announcement messages, and time based video announcement messages.

8 Claims, 9 Drawing Sheets

VIDEO PHONE INTERACTIVE CORPORATE MENU ANSWERING MACHINE ANNOUNCEMENT

FIELD OF THE INVENTION

The invention relates generally to video telephones and more particularly to the reception of video messages from video phone answering machines.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type of DSL modem provided by the local telephone company must also be provided to the end user in the customer premises equipment (CPE). Additionally, since the network is not completely controlled by the interexchange companies, it is difficult for the interexchange companies to provide data at committed delivery rates and/or desired quality levels. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services.

A problem that has plagued many telephone users is the endless phone hierarchies where a customer calls a company or government office and becomes mired in an endless array of menu choices-none of which seem to guide the individual to where he or she would like to go. Often the answering machine will simply hang-up on the individual at the end of one menus without ever providing the individual the information requested. Users often become frustrated at not being able to speak with a human being.

Another problem for many users of telephone answering machines is that it is very difficult to customize a telephone answering machine to reflect the personality of the owner of the machine. We customize our business cards, holiday cards, and letter head, employ different advertising, and decorate our offices to reflect our own personalities, to draw attention to ourselves, and to differentiate our services. However, heretofore, it has been difficult to customize our voice announcement messages. Although some users have added music through the use of a tape recorder playing while the user is recording an announcement, these attempts at customizing a voice greeting are crude at best and are cumbersome to use.

As a further problem, users which are placed on-hold are either provided comfort noise, music, and/or advertisements from the company to which they called. Time on hold often passes very slowly and many users may hang-up. Home users without sophisticated PABX machines are even more disadvantages since these users usually only can provide comfort noise to their customers which are place on-hold.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides a new and improved capabilities for receiving multimedia announcements from multimedia answering machine, including announcement messages for corporations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Figure 1:
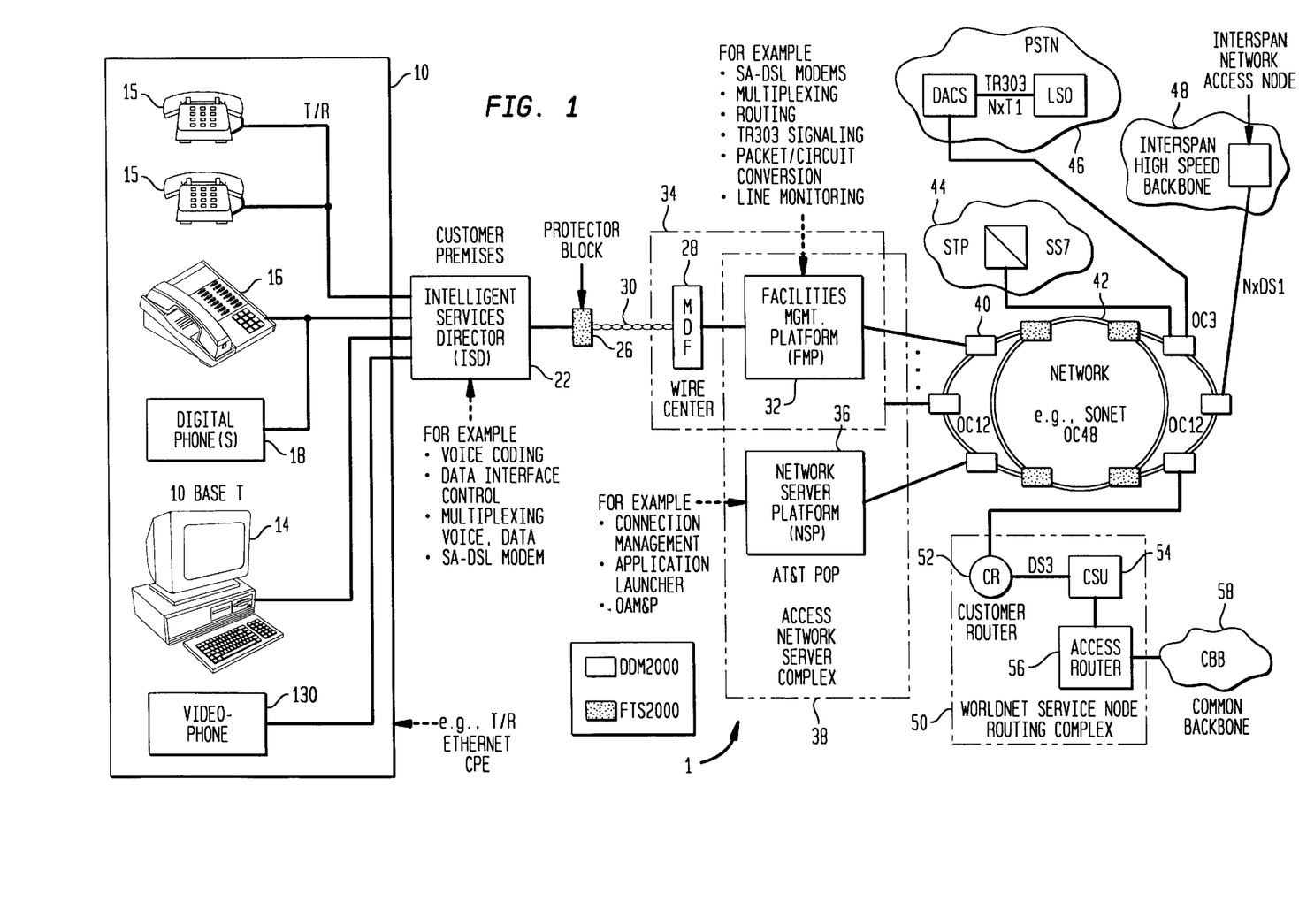
FIG. 1 illustrates an embodiment of a hybrid fiber twisted pair local loop architecture.

Referring to FIG. 1, a first exemplary communication network architecture employing a hybrid fiber, twisted-pair (EFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (AMF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMW) 32 for processing data exchanged across the customer connection 30. The FMP 32 may be configured to separate the plain old telephone service (POTS) from remainder of the data on the customer connection 30 using, for example, a tethered virtual channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment Additionally, the service provider may collect fees from advertisers to subsidize the cost of the equipment.

Figure 2:
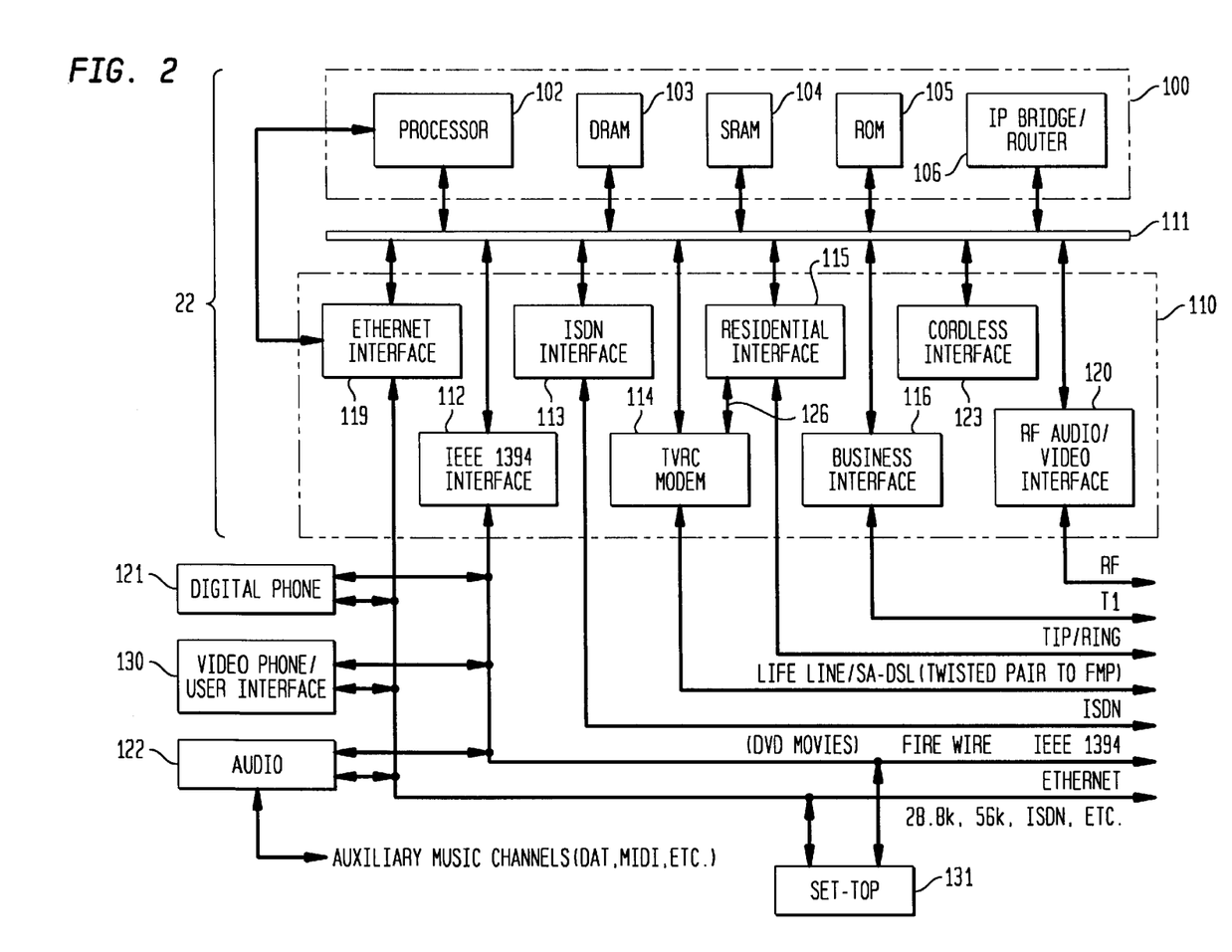
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital video phones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem. As low power CMOS becomes more available, it will become possible to power the ISD from the CO.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include one or more of an integrated services digital network (ISDN)

interface 113, an Ethernet interface 119 (e.g., for 28.8 kbs data, 56 kbs data, ISDN, 10 BaseT, 100 BaseT, etc.), an IEEE 1394"fire wire" interface 112 (e.g., for a digital videodisc device (DVD)), a digital subscriber line (DSL) modem (e.g., a TVRC modem) interface, a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
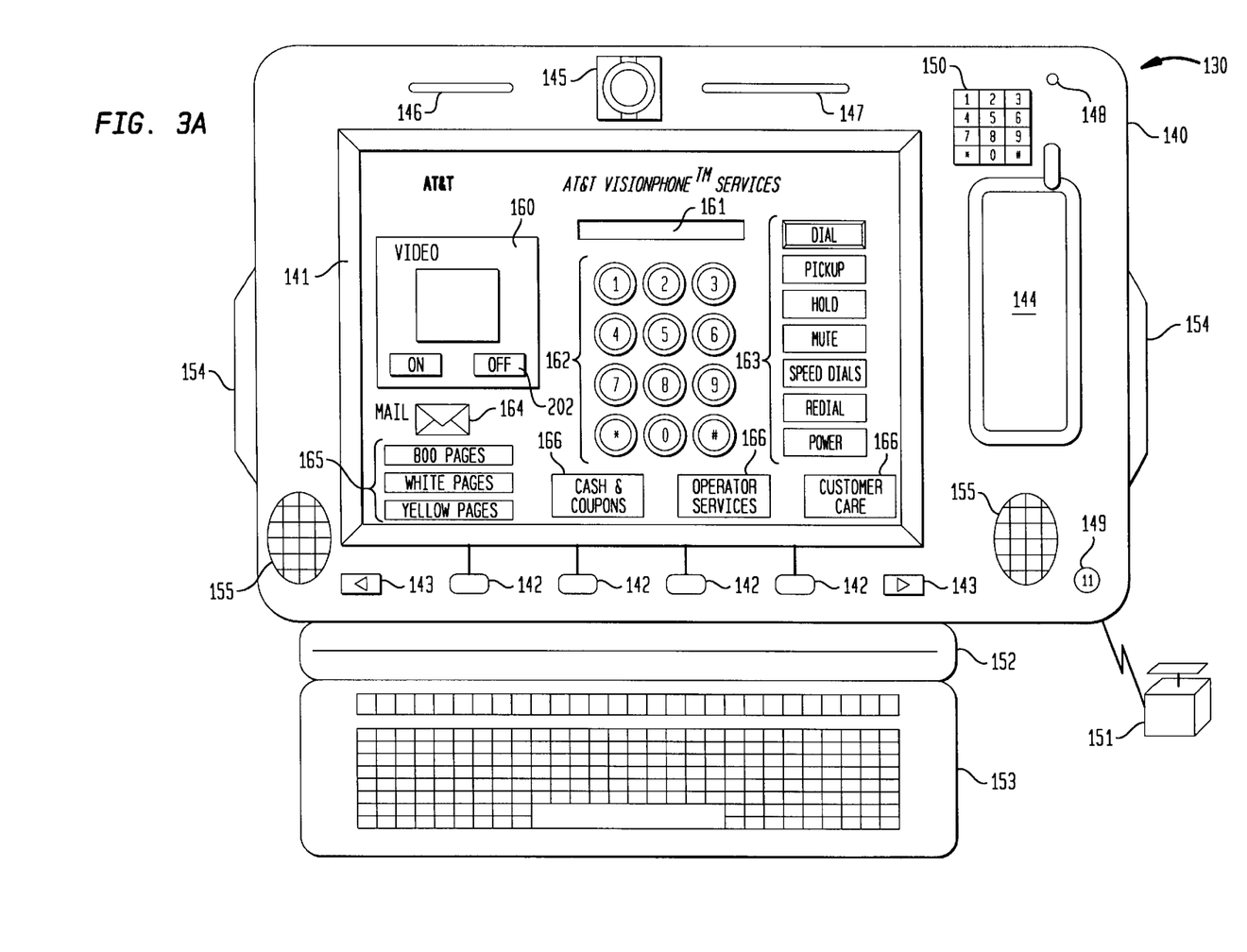
FIGS. 3A and 3B illustrate an embodiment of a video phone consistent with the architecture shown in FIG. 1.
Figure 3B:
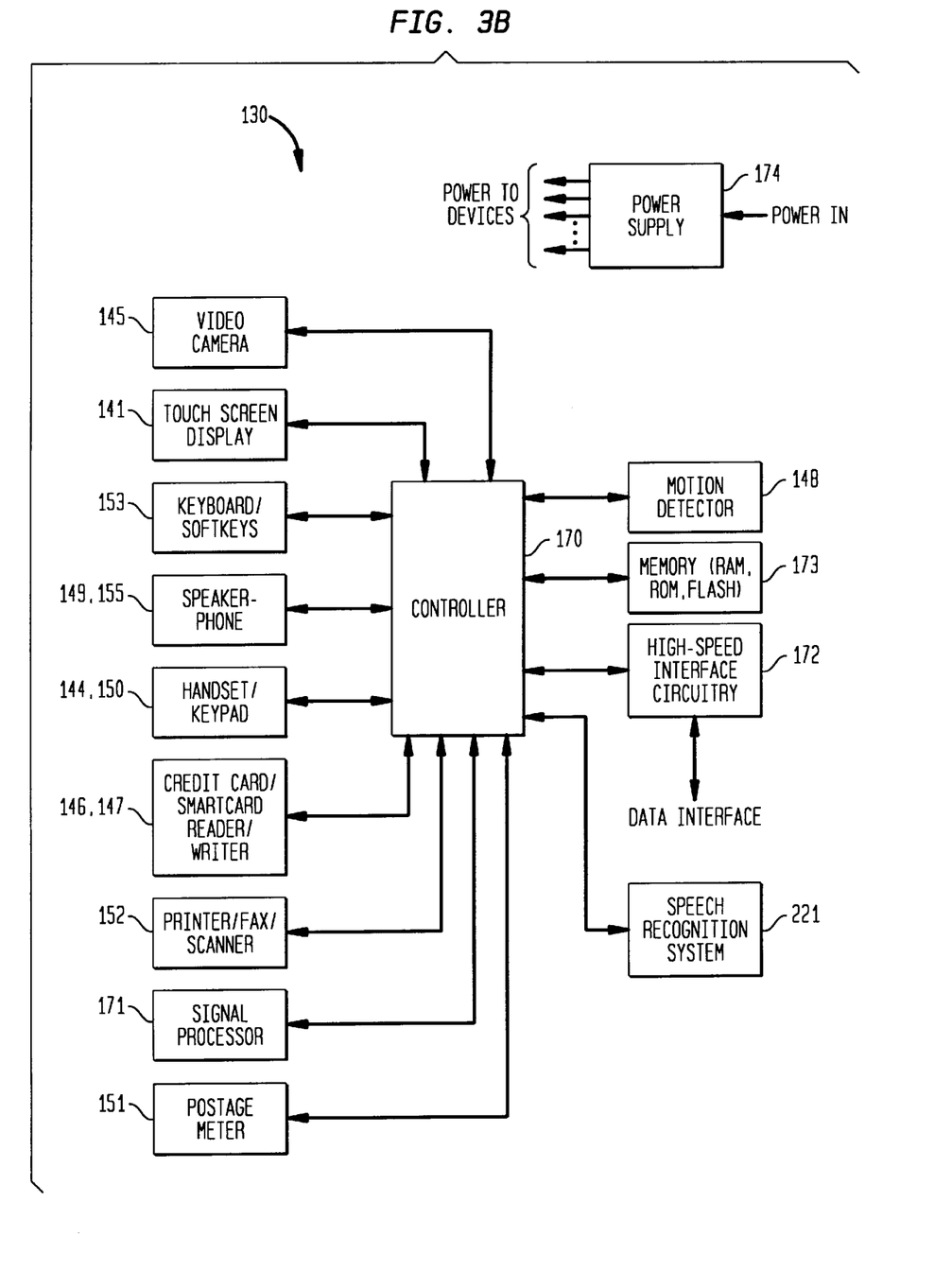

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
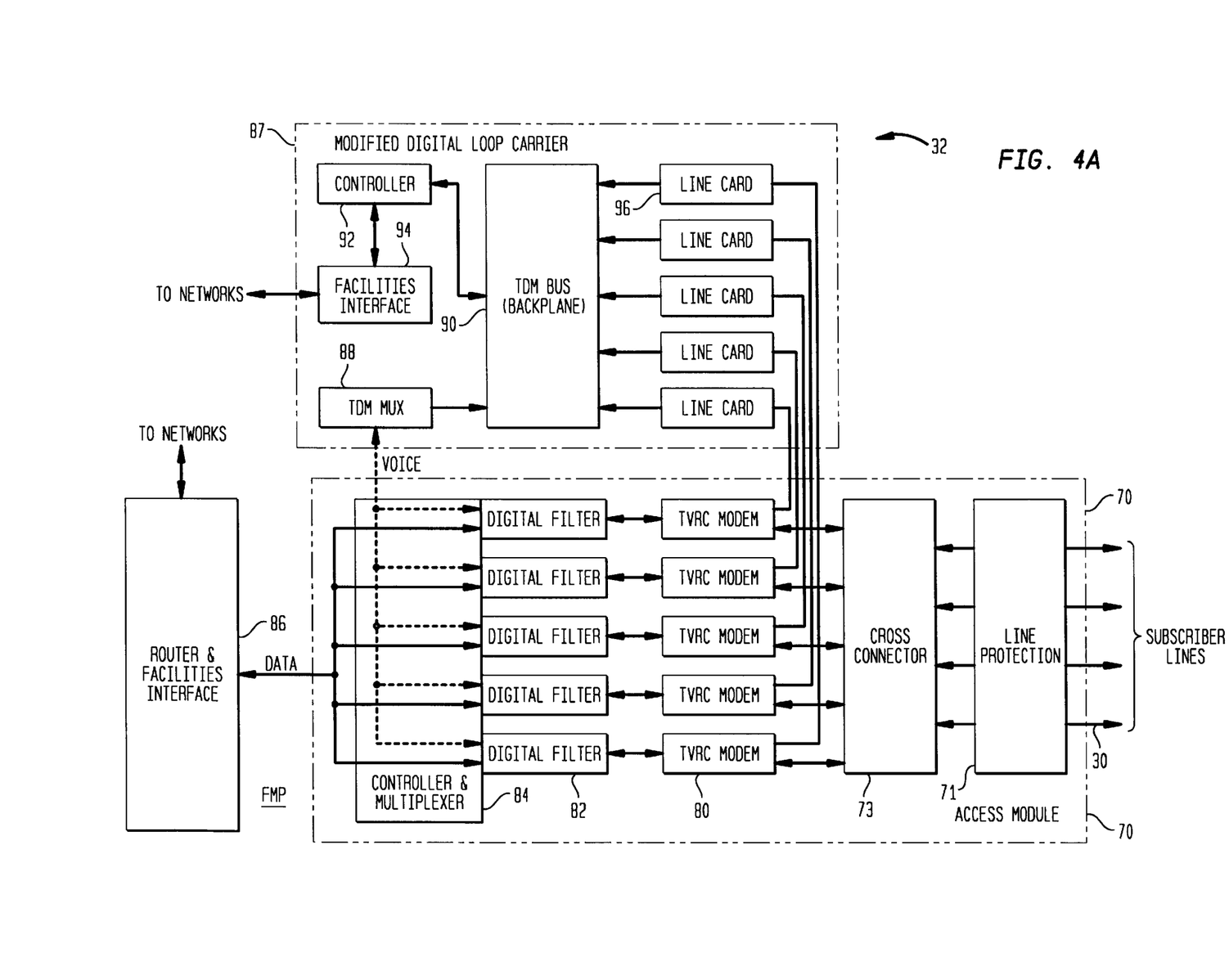
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the modems 80 via the line protector 71 and the cross-connector 73. Preferably, the line protector 71 includes lightning blocks for grounding power surges due to lightning or other stray voltage surges. The modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interfaces 94 may convert between electrical signals and optical signals when a fiber optic link is utilized.

When there is a failure of the digital data link (e.g., if there is a failure of the modems 80 at the FMP 32 or the modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
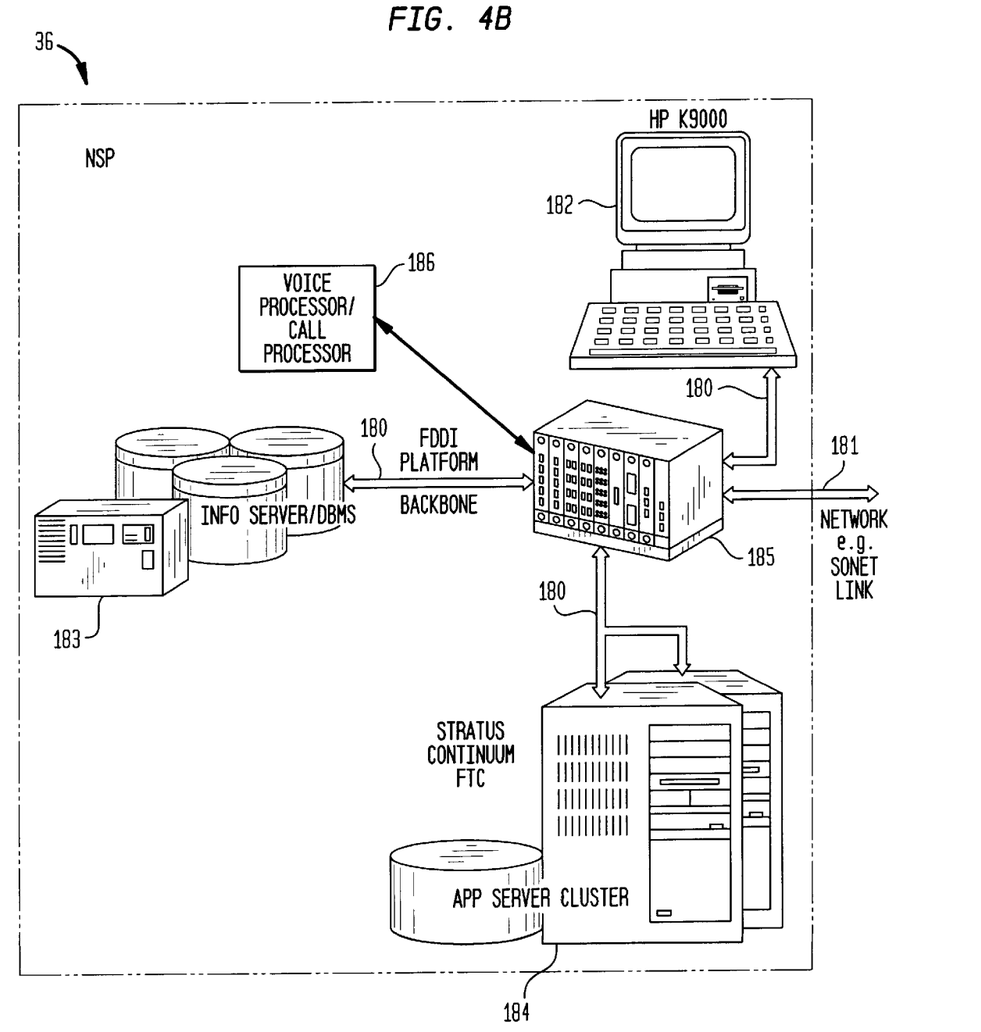
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

The NSP 36, ISD 32, and/or video phone 130 may host a multimedia announcement answering machine which is specifically adapted for corporations and which may direct a calling party to specific resources within the corporation. For example, today when you call a corporation either an operator or a voice menu system answers the phone. The voice menu systems are extremely inefficient and difficult to use. An operator may or may not be trained well enough to direct a party to the correct resources. As an alternative to the conventional systems, where the calling party has video phone capabilities the multimedia answering machine may provide the calling party with an interactive menu structure instead of only audio prompts. Further, where an operator answers the phone, the operator may transfer a video phone enabled user to any menu and/or submenu in a corporate announcement message 300 such as the one shown in FIG. 5.

For example, the operator at a corporate desk may be given a visual indication if a calling party is calling from a video enabled phone. Thus, the operator knows when a caller is video enabled. In exemplary embodiments, this visual indication may be provided on a console displayed to a corporate operator. The calling party's line may be determined to be video enabled using either a message sent from a central database such as the NSP 36, from the FMP 32, from the ISD 22, and/or from the video phone enabled device itself, e.g., video phone 130. Where a centralized data base such as the NSP 36 is not used, the calling party and the called party may determine the various capabilities of each other by exchanging an appropriate start-up protocol. The start-up protocol may be variously configured to include one or more tones followed by an exchange of data packets. For example, a series of message packets may be exchanged to establish a mutually acceptable communication rate (based, in part, on various considerations such as line conditions and the various capabilities of each phone), whether the calling party has his camera enabled, and other compatibility standards such as the protocol used to reproduced the messages to be left at the called parties video phone.

Figure 5:
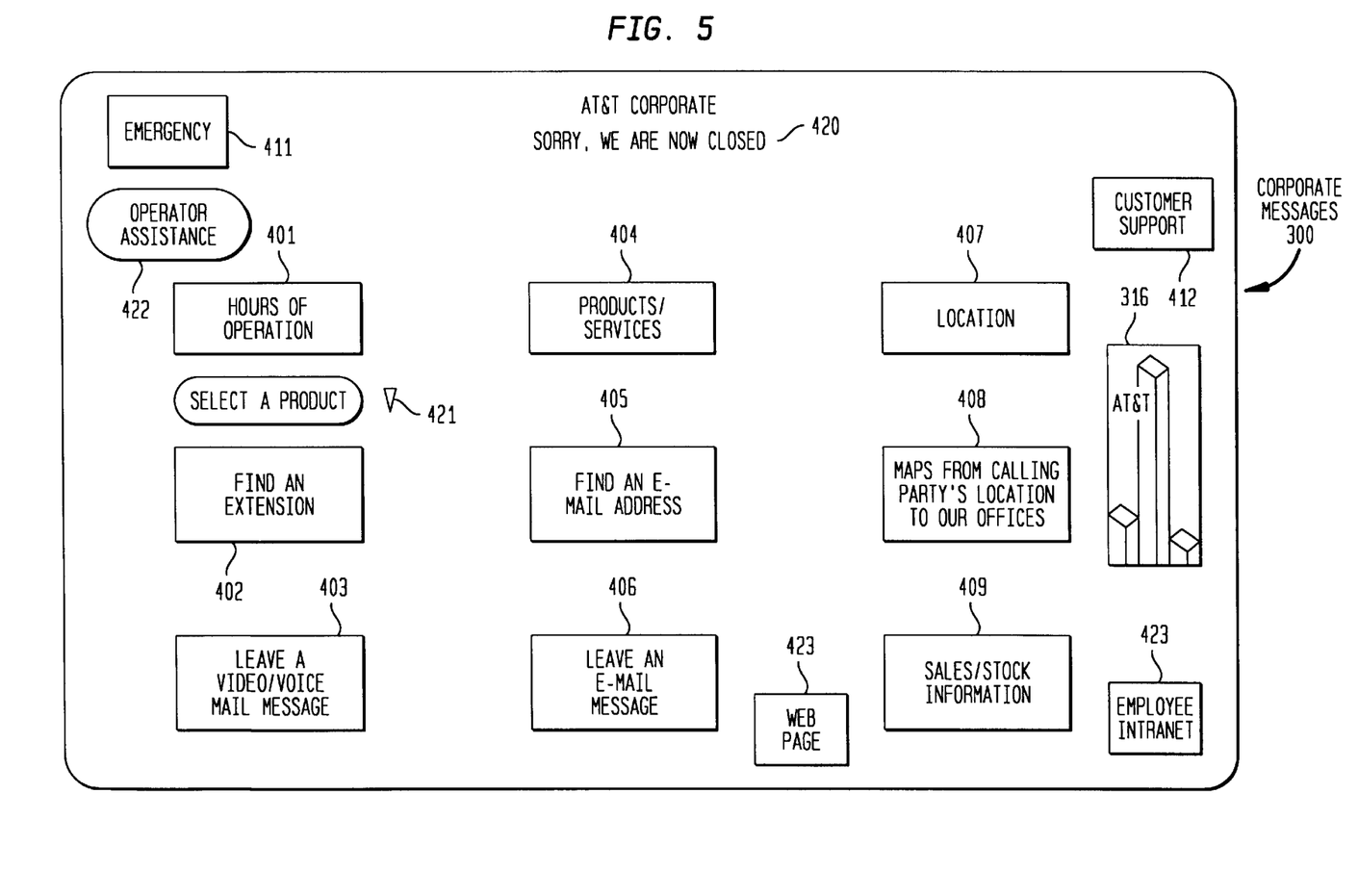
FIG. 5 illustrate a multimedia announcement message which may be utilized by a corporation.
Figure 6:
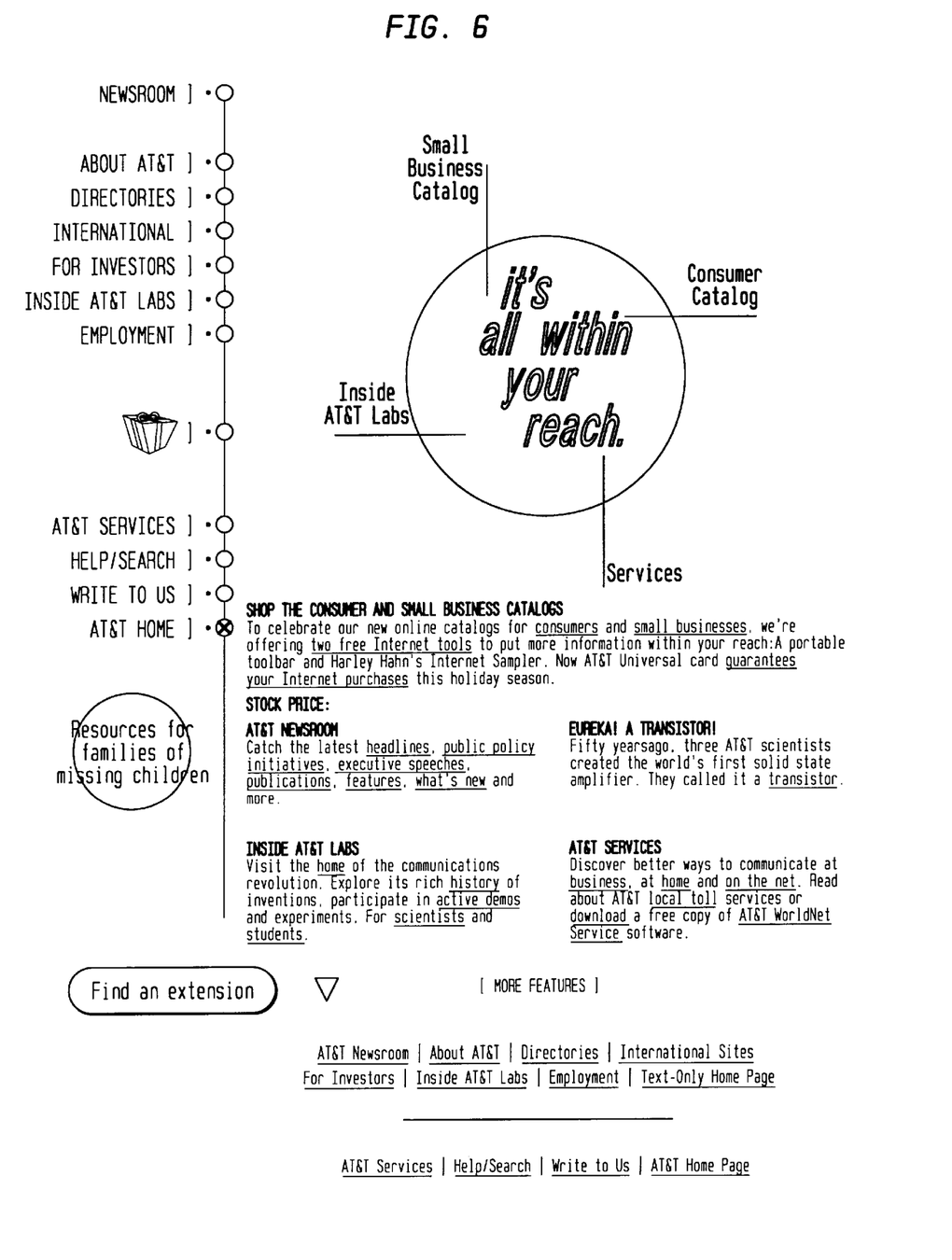
FIG. 6 illustrates an example of a WEB page which may be linked to one or more multimedia announcement messages.
Figure 7:
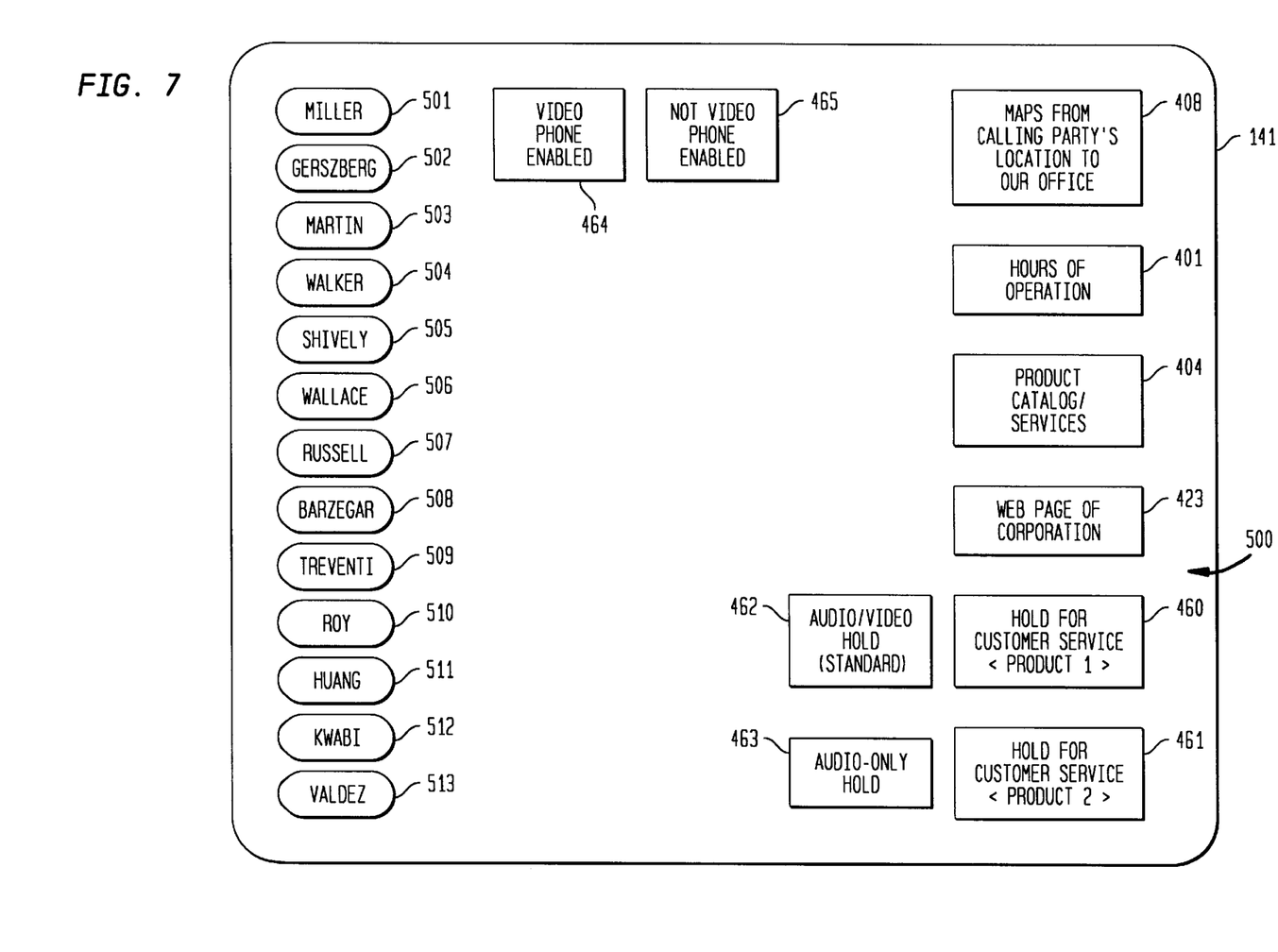
FIG. 7 is one exemplary embodiment of a company's operator control screen for redirecting calls to different individuals within the company and/or to one or more multimedia announcement messages and/or one or more WEB pages.

In one exemplary embodiment, HTML codes and/or a more efficient proprietary protocol geared to telephone networks may be utilized. Where a proprietary protocol is utilized, the proprietary protocol may have certain predefined buttons, greetings, and/or key and greeting locations in order to enable complex screens to be presented while using a minimum amount of bandwidth. The predefined keys or hot buttons may include any of the buttons defined herein. A simple code (e.g., two byte identification, two byte location, and two byte color scheme/design) may be sent with the proprietary protocol used to locally reproduce a hot-button while using a minimum amount of transmission bandwidth. Further, standard graphics could also be identified with a code so that these graphics may be received at a NSP 36 which is physically located near the receiving party such that the network bandwidth is not utilized across the entire bandwidth.

Where the calling party is calling from a video enabled phone, a system at the calling party's location such as an ISD attached video phone and/or a private branch exchange (PBX), may detect the presence of the video enabled phone as discussed above and present the calling party with a corporate message as, for example, shown in FIG. 5. Referring to FIG. 5, the corporate message may be variously configured to include a banner and/or other information message 420, an audio visual message 316 comprising a portion, a substantial portion, and/or all of the display screen 141, and a plurality of hot buttons such as "emergency" 141 for automatically dialing a security service, operator assistance 422 for reaching a night-time operator (if any), select a product 421 for finding additional information on a product offered by the company, find an extension 402 for searching for a particular name to find an extension, leave a video/voice mail message 403 allowing the calling party to leave a video and/or voice message for the company, products/services 404 allowing the calling party to access a directory of products and services, find an E-mail address 405 allowing the calling party to search for a particular address, leave an E-mail message 406 allowing a calling party to leave an E-mail message rather than a voice and/or video mail message, location 407 giving the location of the corporation, maps 408 which, when activated, give directions and/or maps from the calling party's address (obtained from the NSP 36) to the corporation, sales/stock information 409 giving a calling party the latest information on the sales/stock of the corporation, customer support 412 allowing the calling party to access customer support information and/or a corporation's WEB page 423 such as the WEB page shown in FIG. 6 to obtain additional information about the corporation and/or to access WEB based services. The advantage of integrating WEB functionality into video phone based systems is that most corporations already have established WEB servers and support staff. Of course, the audio/video information displayed by a corporate answering machine may be located in any suitable location such as the video phone 130, the ISD 22, the NSP 36 and/or in a video phone enabled PBX/web server located at a corporate site.

Where the corporation has an operator available, an operator screen such as that shown in FIG. 7 may be displayed. For example, an operator counsel 500 may present the operator, in addition to the names of individuals within the company, several other options. In one exemplary embodiment, the operator may be presented with an option to transfer a caller to a hot button activated function within the video phone, ISD, and/or on the NSP and/or to one or more menus and/or submenus of a corporate WEB page. In operation, the operator may transfer the user to either an audio and/or video phone of someone in the corporation 501–513, and/or to one or more menus and/or sub-menus of the corporate message 300 (e.g., maps 408, hours of operation 401, catalogs/services 404, etc.) and/or to one or more menus and/or submenus of the corporate WEB pages.

Where a company does not have an operator or the offices are closed and the multimedia answering machine answers the call directly, a non-video phone enabled caller may simply receive an audio message (e.g., the night message) or may receive the corporate message converted into a series of audio prompts accessed using, for example, DTMF tones. As discussed in the background portion of this specification, often these menu trees are confusing at best for a caller. However, a video phone enabled caller has the assistance of a graphic interface screen similar to that shown in FIG. 5 to help navigate the complex structures more quickly. Further, in exemplary embodiments, a back button is provided in sub-menus to allow the calling party to return to the main menu at any time.

As a further embodiment, a user may pay to utilize NSP memory for the storage of audio and/or video messages. In this manner, a corporation could contract with an interexchange company to host its corporate message and associated data bases. In this manner, a caller to the corporation would be provided with high-speed access to the information with a minimal delay. The interexchange companies could charge for this hosting service. When the user wishes to review the messages, the messages are transparently retrieved from the NSP without the user being aware of the transfer.

As with the announcement messages, the corporate messages may be variously configured to include one or more of the following either alone or in any combination: a video message 355 recorded via camera 145; a video message downloaded from a video playing device such as a digital video camera; a stock video message obtained from a CD (not shown), a stock video message/image obtained from the NSP 36 via the ISD 22 and FMP 32 (e.g., a holiday or seasonal message—Christmas, Thanksgiving, winter, summer, fall, movie star message of a well known movie star with a dubbed audio overlay dynamically recorded, etc.); a still image or photograph scanned in via scanner 152; an audio only message; stock message layouts obtained either locally (via a storage medium, RAM card inserted via smart reader 147, locally attached CD ROM (not shown)) and/or remotely from the NSP contain stock message layouts with the calling party's specific data obtained from a local and/or remote (NSP) database; messages generated locally as discussed in the application entitled VideoPhone Multimedia Announcement Message Toolkit incorporated by reference below; messages which include one or more of the following control buttons: E-mail 312 to allow an called party to reply via E-mail, please call 313 to allow a caller to simply push a button on the video phone to leave a stock message to the receiving party using one of the customized messages above and/or a stock message to have the called party return the call, will call again 314 to notify the called party that you will try to call again, and/or a plurality of alternate contact buttons 317 to provide direct access via pressing one of the buttons to alternate contact information for the calling party such as an E-mail interface button 301, and/or a plurality of speed dial buttons for automatically dialing various devices such as a pager 302 (including sending of the called parties number), cellular phone 303, work phone 304, vacation home 305, and/or facsimile machine 306 of the calling party.

Referring to FIG. 7, the message 300 may be customized for a particular number of a calling party. For example, where the calling party is a corporate employee, a different screen may be displayed. The screen may include a screen similar to the operators screen which lists speed dial numbers for each of the other employees, information normally found on the corporations intranet, and/or various hot buttons for the employee to access E-mail, voice mail, and/or video mail.

A further exemplary embodiment, the message may be customized as described in any of the applications incorporated by reference herein including for seasonal and/or date based greetings.

In operation, the video phone 130 determines if the calling party is video phone enabled. If the calling party is not video phone enabled, just the audio track of the video greeting may be sent to the calling party. Where the calling party has a phone number which matches a customized message indication stored in the database (either locally or at the NSP), the calling party receives a customized message. The customized message may also be modified based on a particular date. For example, the customize message which is not date modified may output a standard message format while the customized greeting which is date modified may have a customized greeting set to acknowledge a corporate sale and/or corporate special event. Further, the corporate message may vary depending on whether the corporation and/or other business is currently open for business. For example, the corporate message may be time and/or date sensitive such that the night screen is displayed while the business is closed while a day screen is displayed while the business is open.

After determining the video capabilities of the calling party, the message may be tailored to the particular capabilities of the calling party. For example, where the calling party is not a video phone but only a video phone enabled phone/PC connected via a 28.8 Kbps modem, the messages may be cropped and/or the resolution reduced to allow standard phone equipped personal computers to receive video phone based announcement messages. Video phone compatible software may be sold to non-video phone personal computer users such that anyone calling using a telephone equipped personal computer may leave and/or receive multimedia messages. The same protocol established between two or more video phones may also be used between a video phone and a personal computer equipped with a telephone. Telecommunication standards for these devices can be set in international standards organizations to enable wide use of the video phone. Alternatively, any known communication standard may be utilized such as a html based system, a MPEG based system, and/or a H.323 compliant video.

An important feature of one or more aspects of the present invention is to call a video phone enable answering machine as a normal phone call, e.g., at a corporate office, and receive a multimedia announcement message in addition to and/or instead of normal operator services. In this manner, the ability to find information, products, and people within a corporation will be enhanced, particularly for people who currently do not have access to the Internet.

The following applications, filed concurrently herewith, are hereby incorporated by reference:

1. A Hybrid Fiber Twisted-pair Local Loop Network Service Architecture (Ser. No. xx/xxx,xxx);
2. Dynamic Bandwidth Allocation for use in the Hybrid Fiber Twisted-pair Local Loop Network Service Architecture (Ser. No. 09/001,425);
3. The VideoPhone (Ser. No. 09/001,905);
4. VideoPhone Privacy Activator (Ser. No. 09/001,909);
5. VideoPhone Form Factor (Ser. No. 09/001,583);
6. VideoPhone Centrally Controlled User Interface With User Selectable Options (Ser. No. 09/001,576);
7. VideoPhone User Interface Having Multiple Menu Hierarchies (Ser. No. 09/001,908);
8. VideoPhone Blocker (Ser. No. 09/001,353);
9. VideoPhone Inter-com For Extension Phones (Ser. No. 09/001,358);
10. Advertising Screen Saver (Ser. No. 09/001,574);
11. Information Display for Visual Communication Device (Ser. No. 09/001,906);
12. VideoPhone Multimedia Announcement Answering Machine (Ser. No. 09/001,911);
13. VideoPhone Multimedia Announcement Message Toolkit (Ser. No. 09/001,345);
14. VideoPhone Multimedia Video Message Reception (Ser. No. 09/001,362);
15. VideoPhone Multimedia Interactive Corporate Menu Answering Machine Announcement (Ser. No. 09/001,575);
16. VideoPhone Multimedia Interactive On-Hold Information Menus (Ser. No. 09/001,356);
17. VideoPhone Advertisement When Calling Video Non-enabled VideoPhone Users (Ser. No. 09/001,361);
18. Motion Detection Advertising (Ser. No. 09/001,355);
19. Interactive Commercials (Ser. No. 09/001,578);
20. VideoPhone Electronic Catalogue Service (Ser. No. 09/001,421);
21. A Multifunction Interface Facility Connecting Wideband Multiple Access Subscriber Loops With Various Networks (Ser. No. 09/001,356);
22.
23. Life Line Support for Multiple Service Access on Single Twisted-pair (Ser. No. 09/001,343);
24. A Network Server Platform (NSP) For a Hybrid Fiber Twisted-pair (HFTP) Local Loop Network Service Architecture (Ser. No. 09/001,582);
25. A Communication Server Apparatus For Interactive Commercial Service (Ser. No. 09/001,344);
26. NSP Multicast, PPV Server (Ser. No. 09/001,580);
27. NSP Internet, JAVA Server and VideoPhone Application Server (Ser. No. 09/001,354);
28. NSP WAN Interconnectivity Services for Corporate Telecommuting (Ser. No. 09/001,540);
29. NSP Telephone Directory White-Yellow Page Services (Ser. No. 09/001,426);
30. NSP Integrated Billing System For NSP services and Telephone services (Ser. No. 09/001,359);
31. Network Server Platform/Facility Management Platform Caching Server (Ser. No. 09/001,429);
32. An Integrated Services Director (ISD) Overall Architecture (Ser. No. 09/001,417);
33. ISD VideoPhone (Custumer Premises) Local House Network (Ser. No. 09/001,418);
34. ISD Wireless Network (Ser. No. 09/001,363);
35. ISD Controlled Set-Top Box (Ser. No. 09/001,424);
36. Integrated Remote Control and Phone (Ser. No. xx/xxx,xxx);
37. Integrated Remote Control and Phone User Interface (Ser. No. 09/001,420);
38. Integrated Remote Control and Phone Form Factor (Ser. No. xx/xxx,xxx);
39. VideoPhone Mail Machine (Attorney Docket No. 3493.73170);
40. Restaurant Ordering Via VideoPhone (Attorney Docket No. 3493.73171);
41. Ticket Ordering Via VideoPhone (Attorney Docket No. 3493.73712);
42. Multi-Channel ParalleVSerial Concatenated Convolutional Codes And Trellis Coded Modulation Encode/Decoder (Ser. No. 09/001,342);
43. Spread Spectrum Bit Allocation Algorithm (Ser. No. 09/001,842);
44. Digital Channelizer With Arbitrary Output Frequency (Ser. No. 09/001,581);
45. Method And Apparatus For Allocating Data Via Discrete Multiple Tones (Ser. No. 08/997,167);
46. Method And Apparatus For Reducing Near-End Cross Talk In Discrete Multi-Tone Modulators/Demodulators (Ser. No. 08/997,176);

In addition, the following two patent applications are hereby incorporated by reference:

1. U.S. patent application Ser. No. 08/943,312 filed Oct. 14, 1997 entitled Wideband Communication System for the Home, to Robert R. Miller, II and Jesse E. Russell, and 2. U.S. patent application Ser. No. 08/858,170, filed May 14, 1997, entitled Wide Band Transmission Through Wire, to Robert R. Miller, II, Jesse E. Russell and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Additionally, the screen display need not necessarily be a touch screen display and may include any suitable screen display including one operable using a mouse interface.

We claim:

1. A method for providing multimedia answering services, comprising:

receiving an incoming call from a caller who is placing said incoming call from a video-enabled device;

determining the video capabilities of said video-enabled device;

selecting an interactive multimedia message according to the video capabilities of said video-enabled device; and selecting said interactive multimedia message according to the current time of day.

2. A method for providing multimedia answering services, comprising:

receiving an incoming call from a caller who is placing said incoming call from a video-enabled device;

determining the video capabilities of said video-enabled device;

selecting an interactive multimedia message according to the video capabilities of said video-enabled device;

determining the identity of said caller; and selecting said interactive multimedia message according to the identity of said caller.

3. A method for providing multimedia answering services, comprising:

receiving an incoming call from a caller who is placing said incoming call from a video-enabled device;

determining the video capabilities of said video-enabled device; and selecting an interactive multimedia message according to the video capabilities of said video-enabled device;

wherein said determining step comprises the steps of:

determining the telephone number of said video-enabled device; and consulting a database containing information identifying the video capabilities of devices associated with said telephone number.

4. A method for providing multimedia answering services, comprising:

receiving an incoming call from a caller who is placing said incoming call from a video-enabled device;

determining the video capabilities of said video-enabled device;

selecting an interactive multimedia message according to the video capabilities of said video-enabled device; and transmitting, to said video-enabled device, a code identifying a predefined visual image which is to be displayed on said video-enabled device.

5. The method of claim 4, where said predefined visual image is a graphical button for performing a predetermined function when selected by a user.

6. A method for providing multimedia answering services, comprising the steps of:

receiving an incoming call from a caller who is placing said incoming call from a video-enabled device;

transmitting an interactive multimedia message to said video-enabled device;

where said interactive multimedia message includes one or more graphical buttons for obtaining additional information about the called party.

7. The method of claim 6, where one of said graphical buttons is an alternate contact button for providing the caller with alternate contact information.

8. The method of claim 6, where one of said graphical buttons is a stock message button for providing the caller with a stock message.

* * * * *